(12) United States Patent
Nawata

(10) Patent No.: US 7,123,888 B2
(45) Date of Patent: Oct. 17, 2006

(54) VARIABLE COMMUNICATION SYSTEM

(75) Inventor: Hizuru Nawata, Tokyo (JP)

(73) Assignee: NEC Corporation, Tokyo (JP)

( * ) Notice: Subject to any disclaimer, the term of this patent is extended or adjusted under 35 U.S.C. 154(b) by 111 days.

(21) Appl. No.: 10/506,623

(22) PCT Filed: Mar. 7, 2003

(86) PCT No.: PCT/JP03/02739

§ 371 (c)(1),
(2), (4) Date: Sep. 3, 2004

(87) PCT Pub. No.: WO03/081799

PCT Pub. Date: Oct. 2, 2003

(65) Prior Publication Data

US 2005/0107050 A1    May 19, 2005

(30) Foreign Application Priority Data

Mar. 7, 2002    (JP) ............................... 2002-062039

(51) Int. Cl.
  H03C 1/62    (2006.01)
  H04B 17/02   (2006.01)
  H04B 1/18    (2006.01)
  H04B 3/46    (2006.01)
  H04B 17/00   (2006.01)
  H04Q 1/20    (2006.01)

(52) U.S. Cl. ................ 455/115.1; 455/133; 455/150.1; 375/225

(58) Field of Classification Search ................ 455/445, 455/115.1, 133, 142, 150.1; 375/225, 315, 375/324

See application file for complete search history.

(56) References Cited

U.S. PATENT DOCUMENTS

2003/0053432 A1*  3/2003  Zehavi ...................... 370/336
2003/0086503 A1*  5/2003  Rennert et al. ............. 375/260

FOREIGN PATENT DOCUMENTS

| JP | H07-86981 A    | 3/1995  |
| JP | H07-123039 A   | 5/1995  |
| JP | H07-245574 A   | 9/1995  |
| JP | H11-215175 A   | 8/1999  |
| JP | 2000-92009 A   | 3/2000  |
| JP | 2000-316035 A  | 11/2000 |
| JP | 2000-350267 A  | 12/2000 |

* cited by examiner

Primary Examiner—Nay Maung
Assistant Examiner—Andrew Wendell
(74) Attorney, Agent, or Firm—Sughrue Mion, PLLC

(57) ABSTRACT

A communication amount monitoring circuit (124) monitors a transmission buffer (123) to which communication data (122) is input, and discriminates the magnitude of the amount of communication data. If the amount of information per unit time is relatively large, information is read out from the transmission buffer in accordance with a chip clock. This information is modulated as communication data (137) by a modulator (139) and transmitted. If the amount of information is relatively small, information is read out from the transmission buffer (123) in accordance with a clock obtained by frequency-dividing the chip clock. This information is exclusive-ORed with a spreading code generated by using the chip clock and is then modulated by a modulator (139). The resultant data is transmitted as communication data (137). Since there is no change in the frequency of the communication data (137), there is no need to provide any resynchronization on the reception device side at the time of switching between the large and small amounts of information. There is therefore no need to provide any buffer area for resynchronization.

12 Claims, 4 Drawing Sheets

(WHEN COMMUNICATION AMOUNT IS SMALL) FREQUENCY (WHEN COMMUNICATION AMOUNT IS LARGE) FREQUENCY

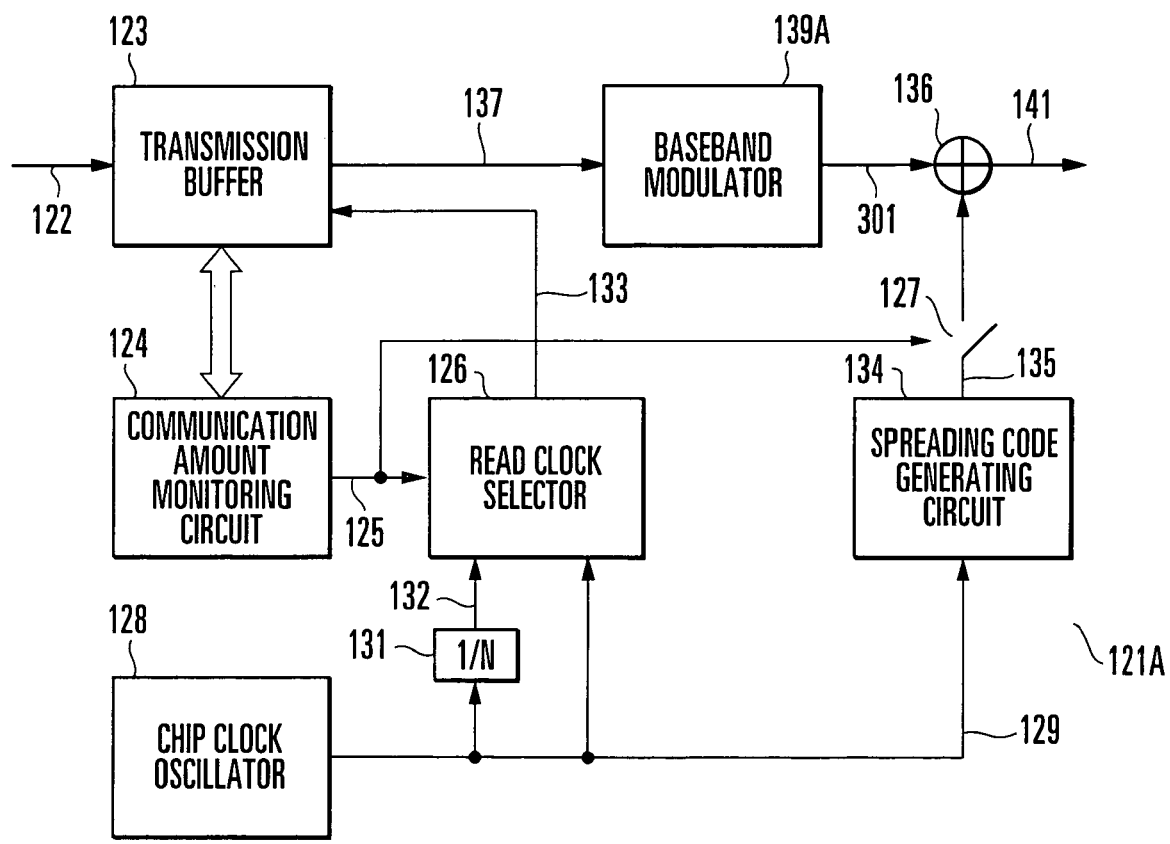
F I G. 7

VARIABLE COMMUNICATION SYSTEM

BACKGROUND OF THE INVENTION

The present invention relates to a digital communication system and, more particularly, to a variable communication system which switches communication schemes in accordance with the communication amount.

In digital communication systems, there have been various proposals to efficiently transmit data. For example, in the digital communication system disclosed in Japanese Patent Laid-Open No. 7-123039, the traffic of communication is detected from an m-sequence signal input to a rate conversion multiplexer (not shown), and the rate conversion multiplexer multiplexes data at a rate corresponding to the traffic. A variable rate modulator (not shown) then modulates the multiplexed signal and transmits it to a transmission path at a transmission rate corresponding to the magnitude of the traffic. That is, the modulation clock rate is time-modulated. On the receiving side, a variable rate demodulator (not shown) performs demodulation, and a rate conversion demultiplexer (not shown) demultiplexes and rate-converts the demodulated signal to reproduce the data. Claim 2 in Japanese Patent Laid-Open No. 2000-316035 proposes a technique of efficiently assigning bands by dynamically changing the transmission rate in accordance with the transmission amount as in the above prior art.

In this manner, in the field of digital communication systems, when the communication amount is small, the transmission rate of information to be transmitted is set low to set a line with a low modulation clock rate, whereas as the communication amount increases, a line with a high modulation clock rate and high transmission rate is set. For example, a router which has selected a general voice line connects to a predetermined content server on the Internet at a given time point to transfer large-volume data. Likewise, when a cell phone switches to the videophone mode during voice communication, the communication amount increases at this time point. In a case opposite to the above case, the communication amount decreases at a predetermined time point.

Properly switching the transmission rates of information in accordance with the communication amount in this manner makes it possible to perform efficient communication. In general, however, when the modulation scheme to be used remains the same, if the transmission rate is low and the modulation clock rate is low, a line tends to relatively deteriorate because it is susceptible to the influences of phase noise in a local oscillator in an up converter which performs frequency conversion to obtain carrier waves or a down converter in a reception unit. This makes it impossible to obtain a stable transmission path. In general, therefore, it is preferable to use a line with a high transmission rate and high modulation clock rate.

In contrast, it is conceivable to use a technique of performing multilevel modulation in the same band by different modulation schemes while the modulation clock rate is kept constant. 16-QAM (Quadrature Amplitude Modulation) which can obtain 16 signal states is capable of obtaining a quadruple transmission rate at the same modulation clock rate as compared with BPSK (Bi-Phase Shift Keying) which is a modulation scheme of making bit information of a baseband correspond to two phases. When, however, multilevel modulation is to be performed, in order to keep transmission path quality (i.e., a bit error rate) equivalent to a modulation scheme with a low transmission rate, it is necessary to increase the output level by an amount equal to or more than a band improvement in terms of transmission rate. In the above case, although 16-QAM realizes a band improvement of 6 dB in terms of transmission rate as compared with BPSK, the transmission carrier power must be increased by 10 dB or more to obtain the same bit error rate at 10E-6 as that in BPSK.

In addition, when the transmission rates are switched in accordance with the communication amount, demodulation synchronization must be established with respect to the transmission rate after switching at the time of this switching operation. Demodulated data is temporarily interrupted until demodulation synchronization is established. Compare a case wherein the transmission rate after switching is high with a case wherein the transmission rare after switching is low. In the latter case, for example, in a carrier wave reproducing circuit, the frequency error of a reception carrier wave with respect to the modulation clock rate becomes relatively large. For this reason, in a PLL circuit for carrier wave reproduction, it takes a longer time to establish demodulation synchronization than in the case wherein the transmission rate after switching is high. Omission of communication data due to the interruption of demodulated data leads to a crucial result on the reproduction of information. In order to prevent omission of information due to the interruption of demodulated data, a buffer memory has been conventionally used. There has been a communication sequence in which when transmission or reception is to be performed, communication data is temporarily stored in the buffer memory, and transmission is stopped at a predetermined timing which poses no problem in the reproduction of information. In this sequence, when the receiving side detects omission of communication data, a re-transmission request is generated to read out the corresponding portion from the buffer memory on the transmitting side and re-transmit it.

In order to prevent omission of communication data and guarantee the perfection of reproduction of information by using such a technique, a considerably large buffer memory must be prepared. If information rates are set in two levels, i.e., a low rate and a high rate, as in the above case, in particular, the interruption of communication data becomes large in the case wherein the information rate is low. In this case, therefore, a buffer memory large enough to cover this must be prepared.

SUMMARY OF THE INVENTION

It is an object of the present invention to provide a variable communication system which reduces the capacity of a buffer memory ascribed to switching of transmission rates while switching communication schemes in accordance with the magnitude of the communication amount per unit time.

In order to achieve the above object, according to the present invention, there is provided a variable communication system characterized by comprising (I) a transmission device including information amount magnitude discrimination means for discriminating whether an amount of information to be transmitted per unit time is relatively large or small, first communication data sending means for, when the information amount magnitude discrimination means discriminates that the amount of information to be transmitted is relatively large, digitally modulating first information as the information into information in a signal form having a predetermined bandwidth with a predetermined center frequency, and sending out the information as communication data, and second communication data sending means for, when the information amount magnitude discrimination means discriminates that the amount of information to be transmitted is relatively small, digitally modulating second information as the information upon performing spread spectrum to obtain the same bandwidth as the predetermined bandwidth with the center frequency, and sending out the information as the communication data, and (II) a reception device including demodulation means for demodulating the communication data sent from the transmission device, de-spreading appropriateness discrimination means for checking whether or not a signal after demodulation can be normally de-spread, first information reproduction means for, when the de-spreading appropriateness discrimination means discriminates that de-spreading cannot be normally performed, reproducing the first information from the signal after demodulation by the demodulation means, de-spreading means for, when the de-spreading appropriateness discrimination means discriminates that de-spreading can be normally performed, de-spreading the signal after demodulation by the demodulation means, and second information reproduction means for reproducing the second information from the signal after de-spreading by the de-spreading means.

That is, the transmission device includes the information amount magnitude discrimination means and discriminates whether the amount of information to be transmitted per unit time is relatively large or small. If it is discriminated from this discrimination result that the information is relatively large, the first communication data sending means digitally modulates the first information into information in a signal form having a predetermined bandwidth with a predetermined center frequency, and sends out the resultant data as communication data. In this regard, there is no specific difference from the prior art. If the information amount magnitude discrimination means discriminates that the information to be transmitted is relatively small, the second information as this information is subjected to spread spectrum and digital modulation to be sent out as communication data. In this case, the necessary bandwidth is spread to the bandwidth associated with the first signal by spread spectrum. The center frequency of the second information is also made equal to that of the first information, and the second information is sent out as communication data. This makes it unnecessary for the demodulation means of the reception device to switch frequencies for the first information and the second information. The time required for this operation is also made unnecessary. In the reception device, the de-spreading appropriateness discrimination means checks whether or not a signal after demodulation can be normally de-spread. If it is determined that de-spreading can be done, this signal is regarded as the second information and de-spread to be reproduced. If it is determined that de-spreading cannot be done, this signal is regarded as the first information and reproduced without performing any spread spectrum.

In the above variable communication system, the transmission device may further comprise a transmission buffer which sequentially receives information to be transmitted and outputs the information in synchronism with a predetermined read clock, and the information amount magnitude discrimination means may discriminate from an amount of information left in the transmission buffer whether the amount of information per unit time is relatively large or small. In addition, the first and second communication data sending means of the transmission device may include chip clock generating means for outputting a chip clock having a predetermined frequency, transmitting-side frequency dividing means for frequency-dividing the chip clock output from the chip clock generating means at a predetermined frequency division ratio, read clock selection means for, when the information amount magnitude discrimination means discriminates that information to be transmitted is relatively large, setting the chip clock as the read clock, and when the information amount magnitude discrimination means discriminates that information to be transmitted is relatively small, setting, as the read clock, a clock obtained by frequency-dividing the chip clock by the transmitting-side frequency dividing means, spreading code generating means for receiving the chip clock and generating a spreading code, transmitting-side switch means which receives an output from the spreading code generating means and is turned on only when the information amount magnitude discrimination means discriminates that information to be transmitted is relatively small, transmitting-side exclusive addition means for calculating exclusive-OR between information output from the transmission buffer in synchronism with the read clock and an output from the transmitting-side switch means, and modulation means for digitally modulating an output from the transmitting-side exclusive addition means and transmitting the output as the communication data. Furthermore, the de-spreading means and the first and second information reproduction means of the reception device may include reception clock generating means for outputting a reception clock identical to the chip clock, de-spreading code generating means for generating a de-spreading code on the basis of the reception clock output from the reception clock generating means, receiving-side switch means which receives an output from the de-spreading code generating means and is turned on only when the de-spreading appropriateness discrimination means discriminates that de-spreading can be performed, receiving-side exclusive addition means for calculating exclusive-OR between an output from the receiving-side switch means and a signal after demodulation by the demodulation means, receiving-side frequency dividing means for frequency-dividing the reception clock at the predetermined frequency division ratio, write clock selection means for, when the de-spreading appropriateness discrimination means discriminates that de-spreading cannot be performed, selecting the reception clock, and when de-spreading appropriateness discrimination means discriminates that de-spreading can be performed, selecting and outputting a clock obtained by frequency-dividing the reception clock by using the receiving-side frequency dividing means, and a reception buffer in which an output from the receiving-side exclusive addition means is written as an input in accordance with the write clock selected by the write clock selection means, and data stored in the reception buffer is set as the information to be transmitted.

That is, the transmission device includes the transmission buffer, and the information amount magnitude discrimination means discriminates from the amount of information left in the transmission buffer whether the amount of information input to the device per unit time is relatively large or small. In accordance with this discrimination result, the period of a read clock for reading out data from the transmission buffer can be changed in two levels. More specifically, if the information amount magnitude discrimination means discriminates that the information to be transmitted is relatively large, a chip clock is used as a read clock. If the information amount magnitude discrimination means discriminates that the amount of information is relatively small, a slow clock is obtained by frequency-dividing this chip clock using the transmitting-side frequency dividing means.

The data read out from the transmission buffer in this manner becomes one input to the transmitting-side exclusive addition means. As the other input, the spreading code generated on the basis of the chip clock is input through the transmitting-side switch means. In this case, the transmitting-side switch means is a switch which is turned on only when the information amount magnitude discrimination means discriminates that the information to be transmitted is relatively small. With this arrangement, if the information amount magnitude discrimination means determines that the information to be transmitted is relatively large, the modulation means outputs a signal, as communication data, which has a bandwidth corresponding to the information amount. If the information amount magnitude discrimination means determines that the amount of information is relatively small, spread spectrum is performed to spread the bandwidth, and the resultant data is output as communication data, which has the same center frequency as that in the case wherein it is determined that the amount of information is relatively large. For this reason, the transmission rate remains the same regardless of the form of communication data received, the demodulation means on the reception device side need not perform demodulation synchronization again. If it is checked on the basis of demodulated data after demodulation by the demodulation means whether spread spectrum can be normally performed, and it is determined that spread spectrum can be performed, the sent signal is regarded as a signal sent by spread spectrum. This signal is then de-spread and written in the reception buffer. Otherwise, the demodulated data after demodulation is written in this reception buffer. In this case, the write clock selection means selects a write clock in accordance with the rate read out from the transmission buffer on the transmission device side. In this manner, the information after demodulation which is to be transmitted is obtained from the reception buffer.

Note that the first and second communication data sending means of the transmission device may include chip clock generating means for outputting a chip clock having a predetermined frequency, transmitting-side frequency dividing means for frequency-dividing the chip clock output from the chip clock generating means at a predetermined frequency division ratio, read clock selection means for, when the information amount magnitude discrimination means discriminates that information to be transmitted is relatively large, setting the chip clock as the read clock, and when the information amount magnitude discrimination means discriminates that information to be transmitted is relatively small, setting, as the read clock, a clock obtained by frequency-dividing the chip clock by the transmitting-side frequency dividing means, modulation means for digitally modulating information output from the transmission buffer in synchronism with a read clock, spreading code generating means for receiving the chip clock and generating a spreading code, transmitting-side switch means which receives an output from the spreading code generating means and is turned on only when the information amount magnitude discrimination means discriminates that information to be transmitted is relatively small, transmitting-side exclusive addition means for calculating exclusive-OR between an output from the modulation means and an output from the transmitting-side switch means and transmitting the data as the communication data.

In addition, the reception clock generating means of the reception device may comprise reception clock reproduction means for reproducing a reception clock from communication data input to the demodulation means.

Furthermore, the information amount magnitude discrimination means of the transmission device may set a predetermined difference between a threshold by which it is discriminated that an information amount is relatively large and a threshold by which it is discriminated that an information amount is relatively small. More specifically, the information amount magnitude discrimination means may set a threshold by which it is discriminated that an information amount is relatively large to a value larger than a threshold by which it is discriminated that an information amount is relatively small.

In addition, the information amount magnitude discrimination means of the transmission device may discriminate, depending on whether or not a path through which information to be transmitted is acquired is a pre-specified path, whether the amount of information to be transmitted per unit time is relatively large or small. Alternatively, the information amount magnitude discrimination means may discriminate, depending on whether or not a device which processes information to be transmitted is set in a pre-specified mode, whether the amount of information to be transmitted per unit time is relatively large or small.

Furthermore, the transmission device and the reception device may comprise a radio device.

Moreover, the transmission device may output transmission power in proportion to a transmission rate. When the transmission rate is low, since the transmission power is decreased, the transmission power density decreases by an amount corresponding to an increase in occupied bandwidth due to spread spectrum.

BRIEF DESCRIPTION OF DRAWINGS

FIG. 7 is a block diagram showing the arrangement of the transmission unit of the first communication device in the fourth embodiment of the present invention.

DETAILED DESCRIPTION OF EMBODIMENTS

The embodiments of the present invention will be described in detail below with reference to the accompanying drawings.

First Embodiment

Figure 1:
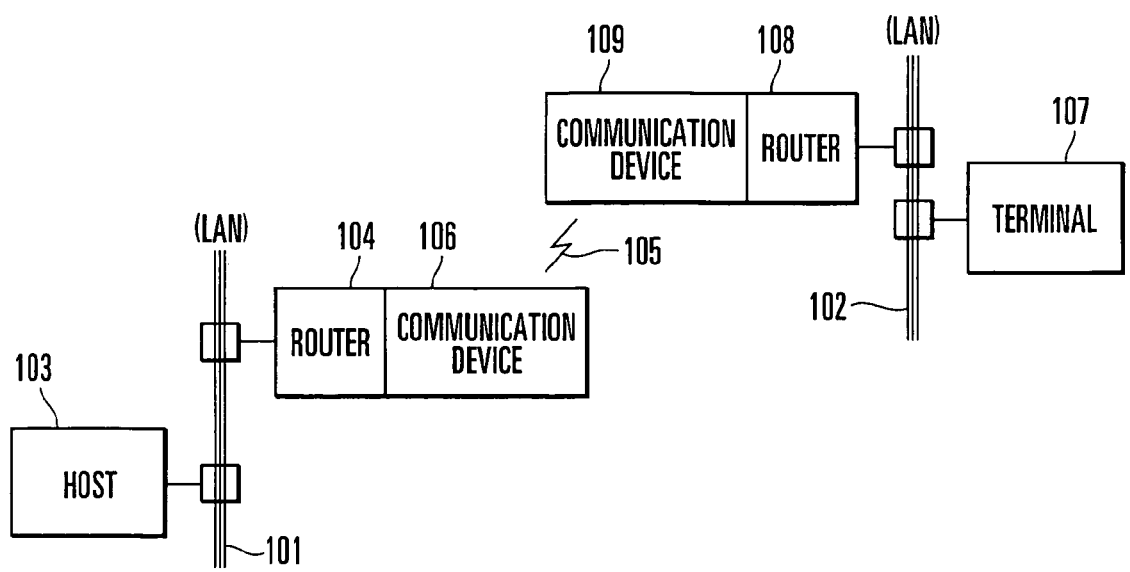
FIG. 1 is a system configuration diagram showing the overall arrangement of a variable communication system according to the first embodiment of the present invention.

FIG. 1 shows the overall arrangement of a variable communication system according to the first embodiment of the present invention. This variable communication system is formed as a communication system in which two LANs (Local Area Networks) including a first LAN 101 and a second LAN 102 are connected to each other. A host computer (HOST) 103 and first router (Router) 104 are connected to the first LAN 101. A first communication device 106 for performing communication with a radio communication channel 105 is connected to the first router 104. A terminal 107 controlled by a host computer (not shown) and a second router 108 are connected to the second LAN 102. A second communication device 109 for performing communication with the radio communication channel 105 is connected to the second router 108.

In this variable communication system, the first and second communication devices 106 and 109 are designed to monitor communication amounts when they perform communication using the radio communication channel 105. Each communication device performs communication upon switching information rates depending on whether the communication amount is relatively large or small. Note, however, that the transfer rate of communication data communicated through the radio communication channel 105 is always kept constant, and when the communication amount is relatively large, a general PSK (Phase Shift Keying) modulation scheme is used to transmit information. When the communication amount is relatively small, spread-spectrum communication is performed. Since the transfer rate of communication data remains unchanged, even if the communication amount varies, transmission rate resynchronization is not required at the time of switching transmission rates. This eliminates any communication interruption time.

Figure 2:
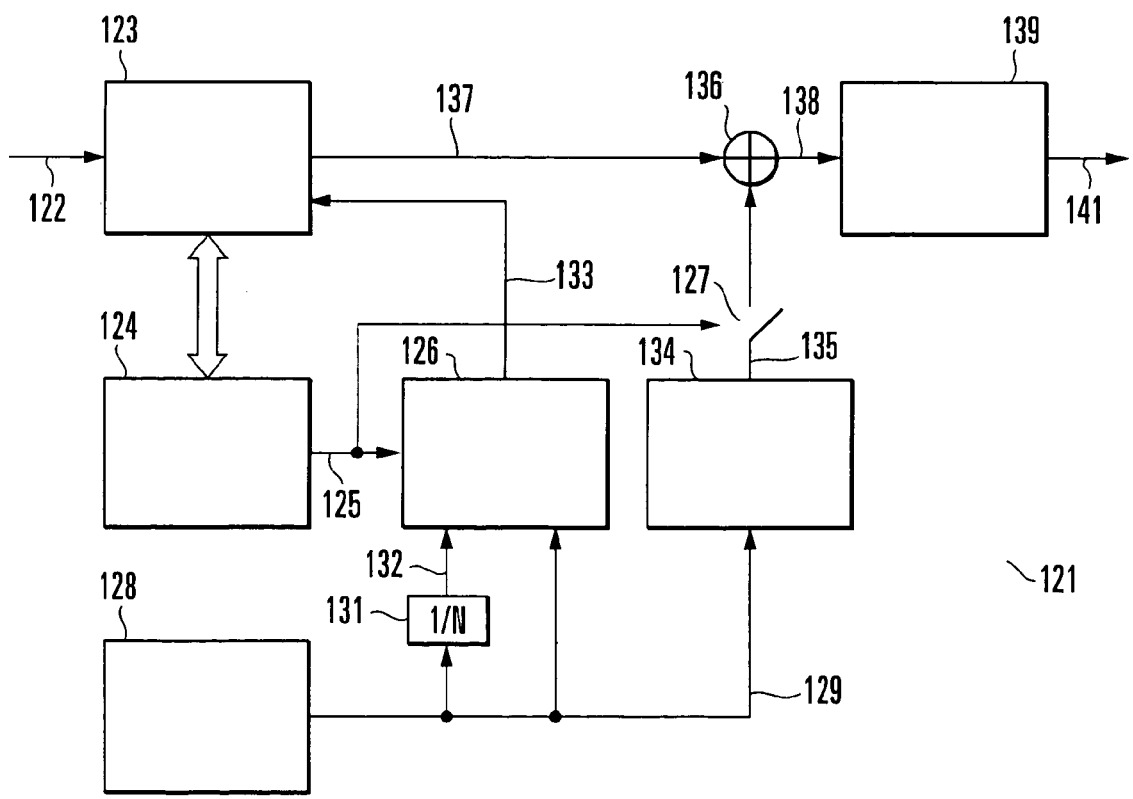
FIG. 2 is a block diagram showing the arrangement of the transmission unit of the first communication device according to this embodiment.

FIG. 2 shows the arrangement of the transmission unit of the first communication device according to this embodiment. The transmission unit of the second communication device 109 shown in FIG. 1 basically has the same arrangement as that of the transmission unit of the first communication device 106. Therefore, a description of the transmission unit of the second communication device 109 will be omitted.

A transmission unit 121 of the first communication device includes a transmission buffer 123 which receives communication data 122 sent from the first router 104 shown in FIG. 1. The transmission buffer 123 is a memory with a relatively small capacity. A communication amount monitoring circuit 124 monitors the communication amount by checking a change in the consumption of the buffer. The communication amount monitoring circuit 124 then outputs a communication amount magnitude discrimination signal 125 indicating whether the amount of communication data 122 sent from the first router 104 is relatively large or small. The communication amount magnitude discrimination signal 125 is input to a read clock selector 126 and the control terminal of a spreading code selection switch 127.

In this case, the read clock selector 126 selects either a chip clock 129 having a predetermined frequency output from a chip clock oscillator 128 or a frequency division output 132 from a 1/N frequency divider 131 which frequency-divides the chip clock 129 to 1/N, and supplies it as a read clock 133 to the transmission buffer 123. In this case, the numerical value N is an integer equal to or more than two. The spreading code selection switch 127 is a switch for turning on/off the supply of a spreading code 135 output from the spreading code generating circuit 134 to one input terminal of an exclusive adder 136. When the contact of the spreading code selection switch 127 is open, a fixed value of signal "0" or signal "1" is supplied to this input terminal of the exclusive adder 136.

The chip clock 129 is supplied to the spreading code generating circuit 134. Communication data 137 read out from the transmission buffer 123 in accordance with the read clock 133 is input to the other input terminal of the exclusive adder 136. The exclusive adder 136 calculates the exclusive-OR (EOR) of the input spreading code 135 and the communication data 137, and inputs an addition output 138 to a modulator 139. The modulator 139 modulates this and sends out a modulated output 141 to the radio communication channel 105 shown in FIG. 1. In this case, the modulator 139 performs spread-spectrum modulation when the communication amount is relatively small, and performs general PSK modulation when the communication amount is relatively large.

Figure 3:
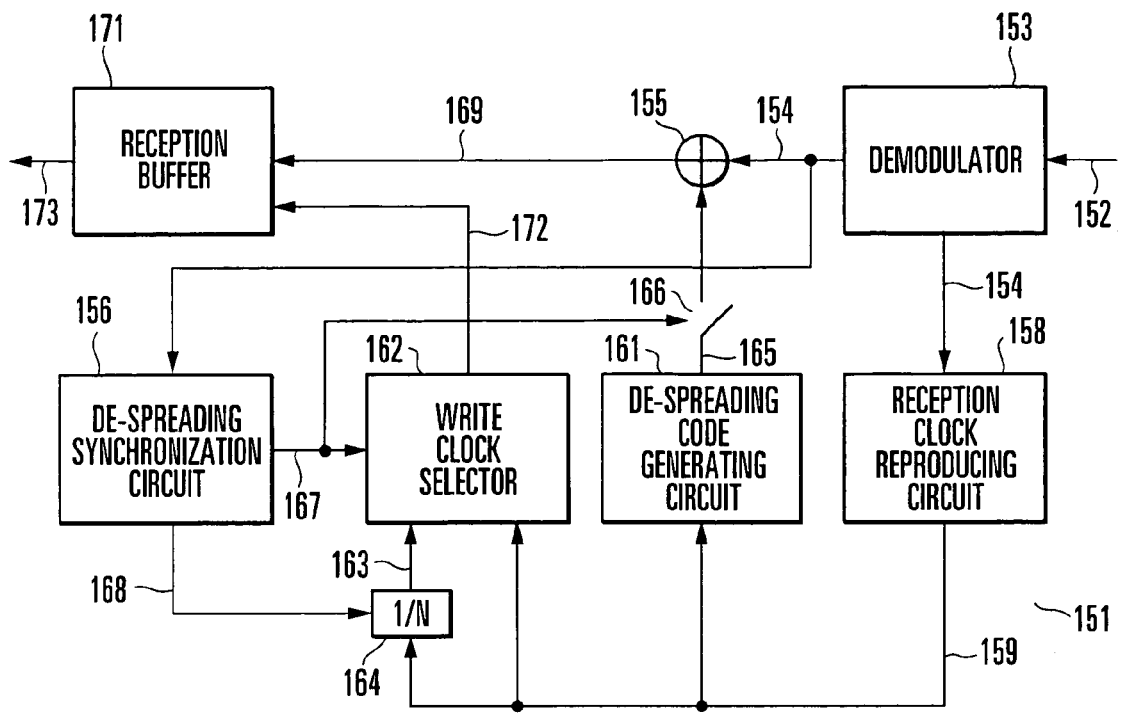
FIG. 3 is a block diagram showing the arrangement of the reception unit of the second communication device according to this embodiment.

FIG. 3 shows the arrangement of the reception unit of the second communication device according to this embodiment. The reception unit of the first communication device 106 shown in FIG. 1 basically has the same arrangement as that of the reception unit of the second communication device 109. Therefore, a description of the reception unit of the first communication device 106 will be omitted.

A reception unit 151 of the second communication device includes a demodulator 153 which receives a reception signal 152 received from the radio communication channel 105 shown in FIG. 1 and demodulates the signal. The demodulator 153 outputs demodulated data 154. The demodulated data 154 becomes one input to an exclusive adder 155 and also becomes an input to a de-spreading synchronization circuit 156. The demodulated data 154 is also input to a reception clock reproducing circuit 158 to reproduce a reception clock 159. Note that the reception clock reproducing circuit 158 may generate a reception clock 159 having a uniquely determined frequency without receiving the demodulated data 154. The reception clock 159 is input to a de-spreading code generating circuit 161, one input terminal of a write clock selector 162, and a 1/N frequency divider 164 which inputs a frequency division output 163 to the other input terminal of the write clock selector 162. The de-spreading code generating circuit 161 generates a de-spreading code 165 on the basis of the reception clock 159, and supplies it to a de-spreading code selection switch 166.

The de-spreading synchronization circuit 156 checks whether or not de-spreading operation can be normally performed on the basis of the demodulated data 154. If de-spreading operation can be normally performed, it is discriminated that the demodulated data 154 is based on spread-spectrum communication, i.e., communication in a case wherein the communication amount is relatively small. Otherwise, it is discriminated that the demodulated data is based on communication using the general PSK modulation scheme, i.e., communication in a case wherein the communication amount is relatively large. The discrimination result is then output as a communication amount magnitude discrimination signal 167. The communication amount magnitude discrimination signal 167 is supplied to the write clock selector 162 and de-spreading code selection switch 166. If de-spreading operation can be normally done, the de-spreading synchronization circuit 156 outputs a synchronization timing signal 168 and supplies it to the 1/N frequency divider 164.

When, therefore, the communication amount is relatively small and spread spectrum is to be performed, the contact of the de-spreading code selection switch 166 is closed by the communication amount magnitude discrimination signal 167, and the de-spreading code 165 is input to the exclusive adder 155. The exclusive adder 155 de-spreads the demodulated data 154 by using the de-spreading code 165, and supplies communication data 169 to a reception buffer 171. In this case wherein spread spectrum is performed, the synchronization timing signal 168 is supplied to the 1/N frequency divider 164, and the frequency division output 163 obtained by frequency-dividing the reception clock 159 to 1/N is supplied to the write clock selector 162, together with the reception clock 159. The write clock selector 162 has received the communication amount magnitude discrimination signal 167 indicating that the communication amount is relatively small. The write clock selector 162 therefore selects the frequency division output 163 obtained by frequency-dividing the reception clock 159 to 1/N and supplies it as a write clock 172 to the reception buffer 171. When the communication amount is relatively small and spread spectrum is performed, therefore, the communication data 169 is sampled by the frequency division output 163 obtained by frequency-dividing the reception clock 159 to 1/N and written in the reception buffer 171.

In contrast to this, when the communication amount is relatively large and communication is to be performed by the general PSK modulation scheme, the contact of the de-spreading code selection switch 166 is opened by the communication amount magnitude discrimination signal 167. The demodulated data 154 output from the demodulator 153 therefore passes through the exclusive adder 155 and is supplied to the reception buffer 171. At this time, the write clock selector 162 selects the reception clock 159 and supplies it as the write clock 172 to the reception buffer 171. When the communication amount is large, the communication data 169 is sampled by the write clock 172 with a high frequency and written in the reception buffer 171. The communication data 169 stored in the reception buffer 171 is sequentially read out as communication data 173.

Figure 4A:
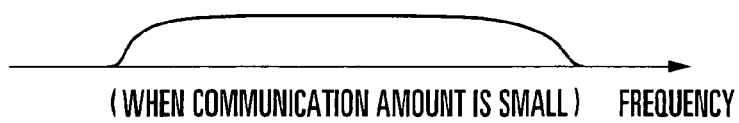
FIGS. 4A and 4B are graphs showing comparison between spectra in a case wherein switching is performed in accordance with the communication amount in this embodiment.
Figure 4B:
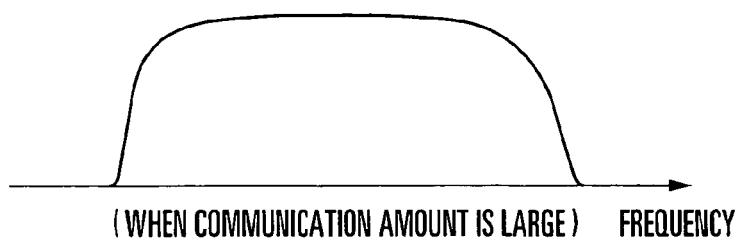

FIGS. 4A and 4B show comparison between spectra when communication schemes are switched in accordance with the communication amount in this embodiment. FIG. 4A shows a case wherein the communication amount is relatively small. FIG. 4B shows a case wherein the communication amount is relatively large. In this embodiment, when the communication amount is relatively small, the spreading code 135 output from the spreading code generating circuit 134 shown in FIG. 2 is exclusively added to the communication data 137 to perform spread spectrum. The chip clock 129 at this time is N times the communication data 137 read out from the transmission buffer 123 in accordance with the read clock 133. Therefore, the data to be transmitted is spread to increase the occupied bandwidth, and is then transmitted.

Figure 5A:
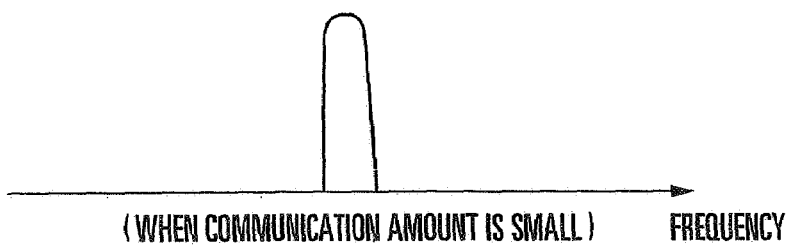
FIGS. 5A and 5B are graphs showing comparison between spectra in a case wherein switching is performed in accordance with the communication amount in the prior art.
Figure 5B:
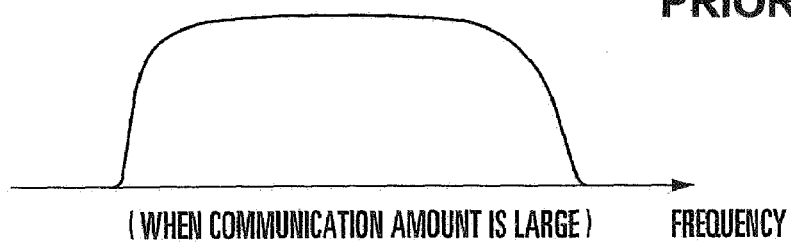

FIGS. 5A and 5B show comparison between spectra when communication schemes are switched in accordance with the communication amount in the prior for the sake of comparison with this embodiment. FIG. 5A shows a case wherein the communication amount is relatively small. FIG. 5B shows a case wherein the communication amount is relatively large. In the prior art, since the general communication scheme is used even when the communication amount is relatively small, the occupied bandwidth is small in accordance with the data amount.

Assume a case wherein 16 kbps (Kbits per second) information exists as a case wherein the communication amount is relatively small. When this information is modulated by the QPSK (Quadrature Phase Shift Keying, Quadri-Phase Shift keying) scheme and transmitted, the transmission symbol rate becomes 16 kHz. In this case, the QPSK scheme is a modulation scheme of making the bit information (00, 01, 10, 11) of a baseband correspond to the phase (0°, 90°, 180°, 270°) of a carrier wave. FIG. 5A shows this.

Assume that spread spectrum is performed as in this embodiment. When the spreading ratio is "128", the product of this ratio and the transmission symbol rate becomes the frequency of the chip clock 129, which is 2,048 kHz. In the case of spread spectrum, as shown in FIG. 4A corresponding to FIG. 5A, the necessary bandwidth increases by 128 times. However, the transmission power required to maintain transmission quality, i.e., the transmission power required to obtain Eb/No (the power density to noise power density ratio per bit in a digital modulated signal) required on the receiving side, is reduced to $\frac{1}{128}$, as compared with the conventional case wherein 2,048 kbps information is transmitted at the same rate with an error correction rate of $\frac{1}{2}$ by QPSK, because energy is spread. This corresponds to a power difference of about 21 dB.

A case wherein the communication amount is relatively large will be described next. In this case, according to this embodiment, general PSK modulation is performed instead of the spread spectrum technique. The transmission symbol rate is set to be the same as the rate of the chip clock 129. This is because when the communication amount is relatively large, the frequency of the read clock 133 for reading out the communication data 137 from the transmission buffer 123 shown in FIG. 2 is inevitably high. In addition, in this embodiment, the center frequency of a carrier wave is set be the same as that obtained by performing spread spectrum as shown in FIG. 4B. That is, when the communication amount is relatively small, the information rate is 16 kbps, whereas the information rate is increased to 2,048 kbps to cope with a case wherein the communication amount is relatively large. In this case, assuming that the same transmission quality as that in the case of 16 kbps is to be maintained, the transmission output power must be increased by 21 dB. Note that FIG. 5B shows a case wherein the communication amount is relatively large in the prior art on the assumption that communication is performed by the same communication scheme as that used when the communication amount is relatively large in this embodiment.

As described above, in this embodiment, when the magnitude of the transmission rate is changed in accordance with the communication amount, i.e., the magnitude of the traffic, since the transmission symbol rate itself remains unchanged, the communication interruption time required for the demodulator to perform resynchronization for a changed transmission rate at the time of switching transmission rates can be eliminated. This can eliminate the necessity of a buffer area for temporarily storing data associated with transmission/reception which is required to cope with a communication interruption. In this embodiment, therefore, only a minimum buffer memory for the discrimination of a communication amount is required, allowing a great reduction in buffer capacity. This makes it possible to simplify the device and reduce the cost of the device.

Second Embodiment

In the first embodiment described above, when the amount of communication data stored in the transmission buffer 123, which temporarily stores the communication data 122, becomes large, the communication amount monitoring circuit 124 connected to the transmission buffer 123 determines that the communication amount is relatively large, and general PSK modulation is performed. Otherwise, when the communication amount monitoring circuit 124 determines that the communication amount is relatively small, communication is performed by the spread spectrum technique. Assume that the communication amount monitoring circuit 124 discriminates, on the basis of the same threshold, whether or not the communication amount is large. In this case, if the communication amount is an almost intermediate value of these values, information rates may be frequently switched. In order to prevent such frequency switching, a predetermined difference may be set between a threshold by which the information rate is switched from the high rate to the low rate and a threshold by which the information rate is switched from the low rate to the high rate. More specifically, the threshold by which the information rate is switched from the high rate to the low rate is set to be smaller than the threshold by which the information rate is switched from the low rate to the high rate.

Third Embodiment

Figure 6:
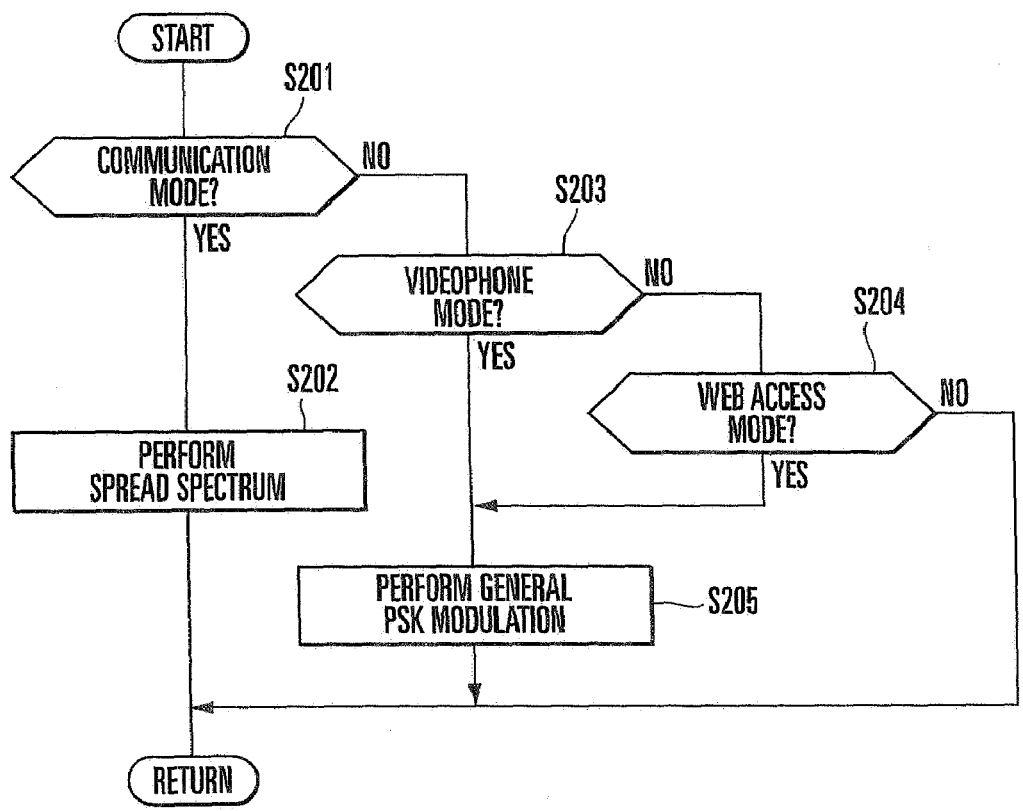
FIG. 6 is a flowchart showing how switching control is performed when communication methods are switched in accordance with the amount of communication data in a cell phone according to the third embodiment of the present invention.

FIG. 6 shows an example of switching control, as the third embodiment, which is performed when communication methods are switched in a cell phone in accordance with the amount of communication data. In this embodiment, a CPU (Central Processing Unit) (not shown) is incorporated in the cell phone (not shown), and the CPU executes a predetermined control program to switch the communication methods. The CPU determines whether or not the general voice communication mode is set (step S201). If the general voice communication mode is set (Y), since the amount of communication data is smaller than that in another mode (to be described next), transmission is performed by using the spread spectrum technique (step S202).

In contrast to this, if the videophone mode is set (step S203: Y), or the Web access mode of, for example, downloading contents upon connection to the Internet (step S204: Y), the CPU determines that the amount of communication data is relatively large, and performs transmission by general PSK modulation (step S205). As in the first embodiment, the transmission symbol rate in spread spectrum in step S202 is equal to that in PSK modulation in step S205. This can therefore eliminate the communication interruption time required for the demodulator to perform resynchronization for a changed transmission rate at the time of switching information rates. In addition, in the third embodiment, since whether the communication amount is large or small is determined without using the transmission buffer 123, unlike the first embodiment, the capacity of the buffer can be further reduced.

Fourth Embodiment

FIG. 7 shows the arrangement of the transmission unit of a first communication device in the fourth embodiment of the present invention, and corresponds to FIG. 2 in the first embodiment. The same reference numerals as in FIG. 2 denote the same parts in FIG. 7, and a description thereof will be omitted as needed.

In a transmission unit 121A of the first communication device according to the fourth embodiment, communication data 137 output from a transmission buffer 123 is directly input to a baseband modulator 139A, which in turn performs baseband modulation. Communication data 301 after modulation is input to one input terminal of an exclusive adder 136. The exclusive adder 136 calculates the exclusive-OR (EOR) of a spreading code 135 input to the other input terminal and the communication data 301, and inputs the addition output as a modulated output 141 to the radio communication channel 105 shown in FIG. 1. Other points are the same as those in the first embodiment.

In the above embodiment, when the amount of communication data is relatively large, general PSK modulation is performed. Obviously, however, if the clock frequency is the same as the frequency of a chip clock used for spread spectrum, information may be modulated by another modulation scheme.

As has been described above, according to the above embodiment, when it is discriminated that the amount of information to be transmitted per unit time is relatively small, spread spectrum is performed to increase the bandwidth to allow transmission with the same bandwidth and the same center frequency as in the case wherein the amount of information to be transmitted is large. For this reason, in spite of the fact that the transmitting side selects one of the two types of signal forms in accordance with the amount of information and transmits the information, the receiving side need not perform resynchronization of the demodulator when the signal forms are switched, because the transmission rate is not changed. This prevents any communication interruption and eliminates the necessity of a buffer area for handling such a problem. In addition, this eliminates the necessity of other circuits to cope with a communication interruption, and hence can achieve simplification of the circuit of the transmission/reception device and a reduction in cost. Furthermore, when the amount of information to be transmitted per unit time is relatively small, since the bandwidth is increased as compared with the prior art, stable communication can be maintained.

In addition, since the information amount magnitude discrimination means uses two different thresholds, even if the information amount takes an intermediate value, stable circuit operation can be ensured.

Furthermore, the magnitude of the information amount may be discriminated in accordance with the path through which information to be transmitted is acquired or the mode used by the device instead of making the information amount magnitude discrimination means discriminate the magnitude of the information amount from the amount of information actually processed. For example, when a homepage is browsed, relatively large volume data is downloaded. When such a path is selected, therefore, communication processing is performed upon determination that the information amount is relatively large. When the device shifts to the videophone mode of performing videophone operation, relatively large volume image data is communicated. When, therefore, such a path is selected, communication processing is performed upon determination that the information amount is relatively large. This allows the execution of standardized processing, and hence saves the circuit the burden of determination. In addition, a reduction in the capacity of the buffer memory can be achieved.

The invention claimed is:

1. A variable communication system characterized by comprising:
   a transmission device including information amount magnitude discrimination means for discriminating whether an amount of information to be transmitted per unit time is greater than or less than a threshold amount, first communication data sending means for, when said information amount magnitude discrimination means discriminates that the amount of information to be transmitted is a first amount, digitally modulating first information as the information into information in a signal form having a predetermined bandwidth with a predetermined center frequency, and sending out the information as communication data, and second communication data sending means for, when said information amount magnitude discrimination means discriminates that the amount of information to be transmitted is a second amount, digitally modulating second information as the information upon performing spread spectrum to obtain the same bandwidth as the predetermined bandwidth with the center frequency, and sending out the information as the communication data, and a reception device including demodulation means for demodulating the communication data sent from said transmission device, de-spreading appropriateness discrimination means for checking whether or not a signal after demodulation can be normally de-spread, first information reproduction means for, when said de-spreading appropriateness discrimination means discriminates that de-spreading cannot be normally performed, reproducing the first information from the signal after demodulation by said demodulation means, de-spreading means for, when said de-spreading appropriateness discrimination means discriminates that de-spreading can be normally performed, de-spreading the signal after demodulation by said demodulation means, and second information reproduction means for reproducing the second information from the signal after de-spreading said de-spreading means, and wherein the first amount is greater than the threshold amount and the second amount is less than a threshold amount.

2. A variable communication system according to claim 1, characterized in that said transmission device further comprises a transmission buffer which sequentially receives information to be transmitted and outputs the information in synchronism with a predetermined read clock, and said information amount magnitude discrimination means discriminates from an amount of information left in said transmission buffer whether the amount of information per unit time is a first or a second amount.

3. A variable communication system according to claim 2, characterized in that said first and second communication data sending means include chip clock generating means for outputting a chip clock having a predetermined frequency, transmitting-side frequency dividing means for frequency-dividing the chip clock output from said chip clock generating means at a predetermined frequency division ratio, read clock selection means for, when said information amount magnitude discrimination means discriminates that information to be transmitted is a first amount, setting the chip clock as the read clock, and when said information amount magnitude discrimination means discriminates that information to be transmitted is a second amount, setting, as the read clock, a clock obtained by frequency-dividing the chip clock by said transmitting-side frequency dividing means, spreading code generating means for receiving the chip clock and generating a spreading code, transmitting-side switch means which receives an output from said spreading code generating means and is turned on only when said information amount magnitude discrimination means discriminates that information to be transmitted is a second amount, transmitting-side exclusive addition means for calculating exclusive-OR between information output from said transmission buffer in synchronism with the read clock and an output from said transmitting-side switch means, and modulation means for digitally modulating an output from said transmitting-side exclusive addition means and transmitting the output as the communication data.

4. A variable communication system according to claim 2, characterized in that said first and second communication data sending means include chip clock generating means for outputting a chip clock having a predetermined frequency, transmitting-side frequency dividing means for frequency-dividing the chip clock output from said chip clock generating means at a predetermined frequency division ratio, read clock selection means for, when said information amount magnitude discrimination means discriminates that information to be transmitted is first amount, setting the chip clock as the read clock, and when said information amount magnitude discrimination means discriminates that information to be transmitted is a second amount, setting, as the read clock, a clock obtained by frequency-dividing the chip clock by said transmitting-side frequency dividing means, modulation means for digitally modulating information output from said transmission buffer in synchronism with a read clock, spreading code generating means for receiving the chip clock and generating a spreading code, transmitting-side switch means which receives an output from said spreading code generating means and is turned on only when said information amount magnitude discrimination means discriminates that information to be transmitted is relatively small, transmitting-side exclusive addition means for calculating exclusive-OR between an output from said modulation means and an output from said transmitting-side switch means and transmitting the data as the communication data.

5. A variable communication system according to claim 3, characterized in that said de-spreading means and said first and second information reproduction means include reception clock generating means for outputting a reception clock identical to the chip clock, de-spreading code generating means for generating a de-spreading code on the basis of the reception clock output from said reception clock generating means, receiving-side switch means which receives an output from said de-spreading code generating means and is turned on only when said de-spreading appropriateness discrimination means discriminates that de-spreading can be performed, receiving-side exclusive addition means for calculating exclusive-OR between an output from said receiving-side switch means and a signal after demodulation by said demodulation means, receiving-side frequency dividing means for frequency-dividing the reception clock at the predetermined frequency division ratio, write clock selection means for, when said de-spreading appropriateness discrimination means discriminates that de-spreading cannot be performed, selecting the reception clock, and when de-spreading appropriateness discrimination means discriminates that de-spreading can be performed, selecting and outputting a clock obtained by frequency-dividing the reception clock by using said receiving-side frequency dividing means, and a reception buffer in which an output from said receiving-side exclusive addition means is written as an input in accordance with the write clock selected by said write clock selection means, and data stored in said reception buffer is set as the information to be transmitted.

6. A variable communication system according to claim 5, characterized in that said reception clock generating means comprises reception clock reproduction means for reproducing a reception clock from communication data input to said demodulation means.

7. A variable communication system according to claim 2, characterized in that said information amount magnitude discrimination means sets a predetermined difference between a threshold by which it is discriminated that an information amount is a first amount and a threshold by which it is discriminated that an information amount is a second amount.

8. A variable communication system according to claim 7, characterized in that said information amount magnitude discrimination means sets a threshold by which it is discriminated that an information amount is a first amount value larger than a threshold and by which it is discriminated that an information amount is a second amount value smaller than the threshold.

9. A variable communication system according to claim 1, characterized in that said information amount magnitude discrimination means discriminates, depending on whether or not a path through which information to be transmitted is acquired is a pre-specified path, whether the amount of information to be transmitted per unit time is relatively large or small.

10. A variable communication system according to claim 1, characterized in that said information amount magnitude discrimination means discriminates, depending on whether or not a device which processes information to be transmitted is set in a pre-specified mode, whether the amount of information to be transmitted per unit time is relatively large or small.

11. A variable communication system according to claim 1, characterized in that said transmission device and said reception device comprise a radio device.

12. A variable communication system according to claim 1, characterized in that said transmission device outputs transmission power in proportion to a transmission rate.

* * * * *